United States Patent [19]

Deutsch

[11] Patent Number: 5,603,477
[45] Date of Patent: Feb. 18, 1997

[54] APPARATUS FOR SUPPORTING A BEVERAGE CONTAINER

[75] Inventor: Peter K. Deutsch, Novato, Calif.

[73] Assignee: Marinco, Napa, Calif.

[21] Appl. No.: 531,044

[22] Filed: Sep. 20, 1995

[51] Int. Cl.$^6$ ............................................. A47K 1/08
[52] U.S. Cl. ................ 248/311.2; 248/313; 248/292.12
[58] Field of Search .......................... 248/311.2, 313, 248/292.12, 316.5

[56] References Cited

U.S. PATENT DOCUMENTS

| D. 280,263 | 8/1985 | Hoye | D3/40 |
|---|---|---|---|
| 4,511,072 | 4/1985 | Owens | 224/273 |
| 4,828,211 | 5/1989 | McConnell et al. | 248/311.2 |
| 4,887,784 | 12/1989 | Kayali | 248/311.2 |
| 4,903,872 | 2/1990 | Henricksen et al. | 224/42.43 |
| 5,167,392 | 12/1992 | Henricksen | 248/311.2 |
| 5,284,314 | 2/1994 | Misaras et al. | 248/311.2 |
| 5,318,266 | 6/1994 | Liu | 248/311.2 |
| 5,423,508 | 6/1995 | Isenga et al. | 248/313 |
| 5,505,417 | 4/1996 | Plocher | 248/313 |

*Primary Examiner*—Leslie A. Braun
*Assistant Examiner*—Willie Berry, Jr.
*Attorney, Agent, or Firm*—Thomas R. Lampe

[57] ABSTRACT

Apparatus for supporting a beverage container includes a back member and a base member attached to the back member for supporting the back member in an upright condition. Holder arms project outwardly from the back member over the base member and define an opening for receiving a beverage container. Beverage container engagement members are pivotally attached to the holder arms and are pivotally movable to accommodate different sized beverage containers.

11 Claims, 3 Drawing Sheets

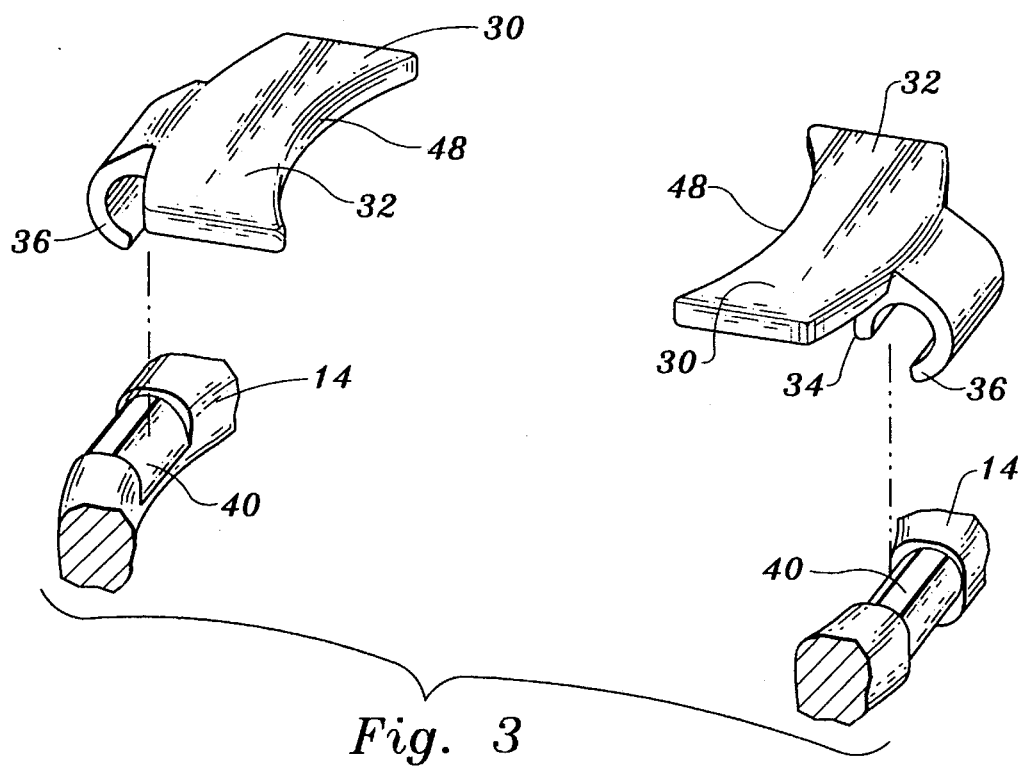
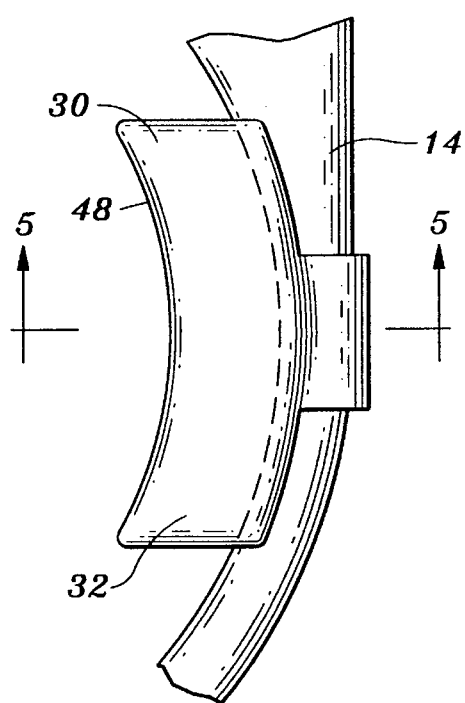
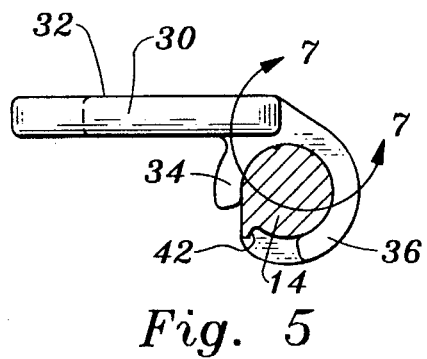
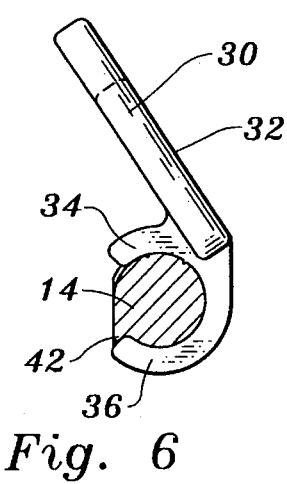
Fig. 3
Fig. 4
Fig. 5
Fig. 6

5,603,477

APPARATUS FOR SUPPORTING A BEVERAGE CONTAINER

TECHNICAL FIELD

This invention relates to apparatus for holding a beverage container. More particularly, the apparatus is adjustable for receiving various sizes of beverage containers. The apparatus itself may be readily secured to a boat, vehicle or any other suitable support.

BACKGROUND ART

U.S. Pat. No. 4,828,211, issued May 9, 1989, discloses a holder for containers including a back panel for mounting on a generally vertical surface and a base member pivotally attached to the bottom of the back panel for supporting the container. Two arms are located at the top of the back panel to embrace a container resting on the base member, the arms being supported on a track for independent sliding movement to provide adjustment of the size of the opening between the arms to accommodate containers of different sizes.

U.S. Pat. No. 5,167,392, issued Dec. 1, 1992, discloses a similar approach; however, in this instance the two arms near the top of the back panel are pivoted to adjust the size of the opening between the arms. Such an arrangement is relatively complicated and expensive due to the number and structural sophistication of the parts that must be employed in the practice of the invention. Furthermore, it will be appreciated that any arrangement which allows relative movement of the holder arms toward and away from each other cannot provide the degree of stability provided when the arms do not move apart to change the size of the container opening.

U.S. Pat. No. 4,511,072, issued Apr. 16, 1985, discloses a drinking cup holder for automobiles including a tray which receives a drinking cup. A pair of arms are mounted on wheels 23 rotatably connected to the tray. Spaced notches are formed in the wheels which receive spring biased balls to position the arms in different attitudes suitable for receiving various sizes of cups or containers therebetween. Such an arrangement is relatively complex and expensive. In addition, the movable arms would not appear to have the stability required to hold a beverage container in position under conditions found in a moving boat or automobile.

U.S. Design Pat. No. 280,263, issued Aug. 27, 1985, discloses an ornamental design for a beverage holder for boats in which side walls are deployed between an upper holder ring and a base member pivotally attached to a back to maintain the structural elements in a condition suitable for receiving containers.

U.S. Pat. No. 4,903,872 discloses a vehicular mounted food receptacle including a cup holder of fixed dimension.

DISCLOSURE OF INVENTION

The present invention relates to apparatus for supporting a beverage container which can be readily utilized to support and hold different sized containers yet is characterized by its simplicity and relatively low cost. The apparatus employs beverage container engagement means which may be readily attached to or detached from holder arms of the apparatus. Such an approach readily lends itself to either retrofit of existing apparatus or incorporation therein during manufacture.

The apparatus of the present invention includes a back member and a base member attached to the back member for supporting the back member in an upright condition.

The apparatus also includes beverage container holder means including a pair of holder arms projecting outwardly from the back member over the base member and defining an opening for receiving a beverage container.

Beverage container engagement means is connected to at least one of the holder arms and movable relative thereto for selectively constricting the size of the opening defined by the holder arms.

The beverage container engagement means comprises a beverage container engagement member pivotally attached to at least one of the holder arms and pivotally movable between a first position wherein the opening is constricted by the beverage container engagement member and a second position wherein the opening is generally unconstricted by the beverage container engagement member.

The beverage container engagement member includes an attachment element at least partially surrounding and frictionally engaging a holder arm to provide a pivotal interconnection between the beverage container engagement member and holder arm. The attachment element includes two attachment arms defining a recess of substantially circular-shaped cross-section receiving a holder arm and a gap between the attachment arms communicating with the recess. At least one of the attachment arms is deformable to allow the holder arm engagement members to be selectively snapped into or out of engagement with the holder arms.

Other features, advantages, and objects of the present invention will become apparent with reference to the following description and accompanying drawings.

BRIEF DESCRIPTION OF DRAWINGS

FIG. 3 is a partial, exploded view of segments of the holder arms and the beverage container engagement members associated therewith in a position assumed thereby prior to installation of the beverage container engagement members on the holder arms;

FIG. 4 is an enlarged, partial, top view illustrating one of the beverage container engagement members and a portion of its associated holder arm to which it is pivotally attached;

FIG. 5 is a cross-sectional view taken along line 5—5 of FIG. 4;

FIG. 6 is a sectional view showing a beverage container engagement member at its inclined or generally unconstricting position relative to its associated holder arm;

BEST MODE FOR CARRYING OUT THE INVENTION

Figure 1:
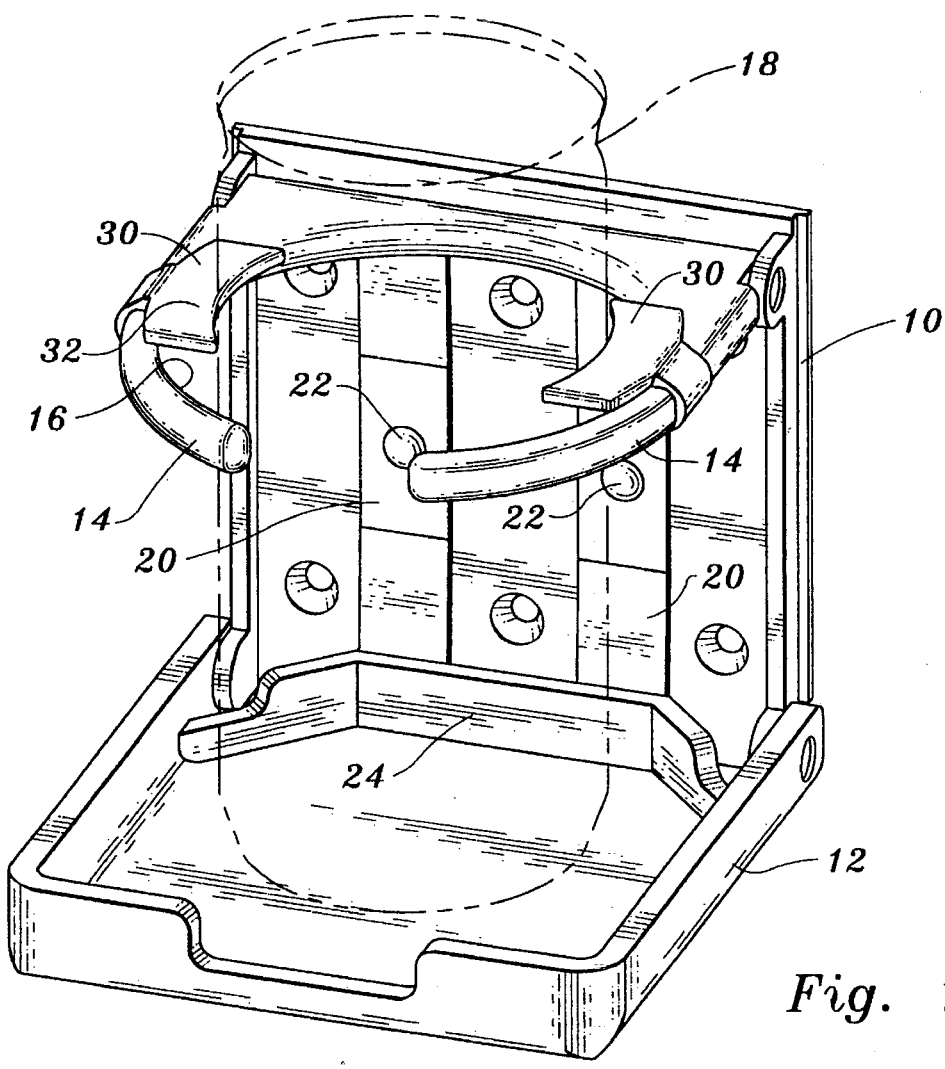
FIG. 1 is a perspective view of apparatus constructed in accordance with the teachings of the present invention holding a container in the form of a beverage can, the latter being shown in phantom lines, with the beverage container engagement members of the apparatus constricting the opening between the holder arms and engaging opposed sides of the container.

Referring now to the drawings, apparatus constructed in accordance with the teachings of the present invention includes a back member 10 and a base member 12 pivotally attached to the back member.

A pair of holder arms 14 are pivotally attached to the back member 10, the arms projecting outwardly from the back member over the base member when the apparatus is in use as a holder. Arms 14 define an opening 16 for receiving a beverage container. A beverage container in the form of a can 18 is illustrated in phantom in FIG. 1.

In the arrangement illustrated, the arms 14 are integrally connected together and have distal ends defining a gap. However, it is to be understood that the principles of the present invention have application to holder arms which are not integrally secured together as well as to holder arms which meet at their distal ends to form a closed opening.

The back member, base member and arms may be constructed of any suitable material such as molded plastic.

FIG. 1 shows the apparatus in use and with the base member and the back member orthogonal with respect to one another. The holder arms are shown in FIG. 1 in a first position wherein the holder arms are orthogonally disposed relative to the back member and substantially parallel to the base member.

Figure 8:
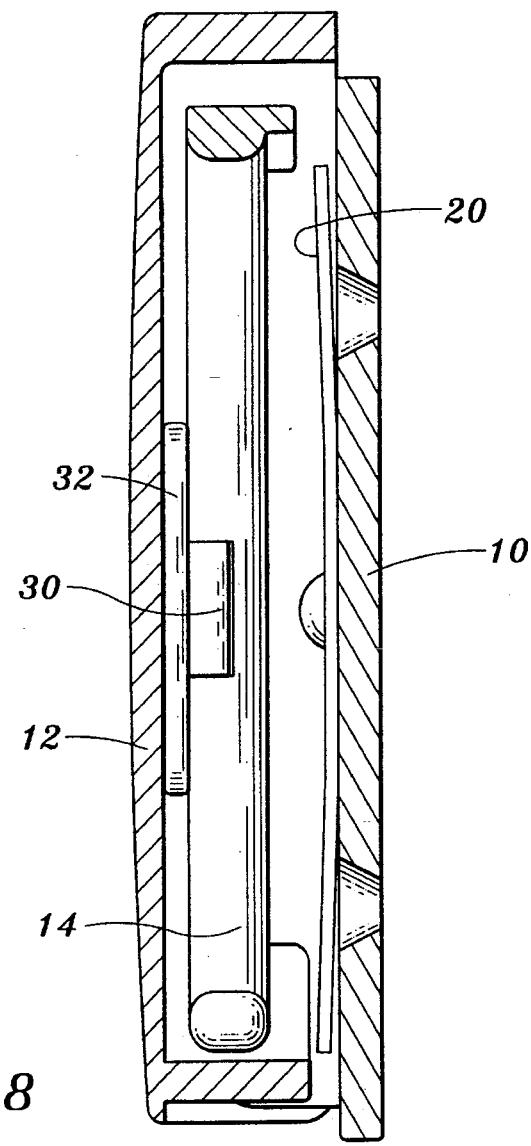
FIG. 8 is a full sectional side view illustrating the apparatus in closed or nonuse condition.

The apparatus may be collapsed to the position shown in FIG. 8 wherein the base member and back member are parallel and define an apparatus interior accommodating the holder arms which have been moved to a position parallel with the base member and closely adjacent thereto.

The arrangement just described is of known construction and need not be described in detail. Suffice it to say that any suitable means may be employed to maintain the structural elements of the apparatus just described in the condition shown in FIG. 1 or permit same to be moved to the collapsed condition shown in FIG. 8. In the disclosed arrangement, two springs 20 of sheet metal or the like are secured to the back member 10 by rivets 22. The free ends of the springs 20 are free to flex toward or away from the back member.

In FIG. 1 the lower ends of the springs engage an integral structural element 24 incorporated on base member 12 to maintain the orthogonal relationship between the base member and the back member. However, a user, by exerting a force on the back member and base member, can readily relatively pivot same against the urging of the springs to the positions shown in FIG. 8. A similar arrangement (not shown) is employed to position the integral arms 14 relative to the back member.

Pivotally attached to each of the holder arms 14 is a beverage container engagement member 30. Each member 30 includes a beverage container engagement plate 32 and two attachment arms 34, 36 integrally connected to the plate 32. Each beverage container engagement member is constructed of molded plastic or other suitable material. At least one of the arms 34, 36 is flexible to allow the holder arm engagement members to be selectively snapped into or out of engagement with the holder arms. FIG. 3 shows the members 30 just prior to attachment thereof to holder arms 14.

The arms 34, 36 define a recess of substantially circular-shaped cross-section receiving a holder arm as well as a gap between the distal ends of the arms communicating with the recess and allowing for the ingress and egress of the holder arm during attachment or detachment.

The attachment element partially surrounds and frictionally engages a holder arm to provide a pivotal interconnection between the beverage container engagement member and associated holder arm.

Figure 2:
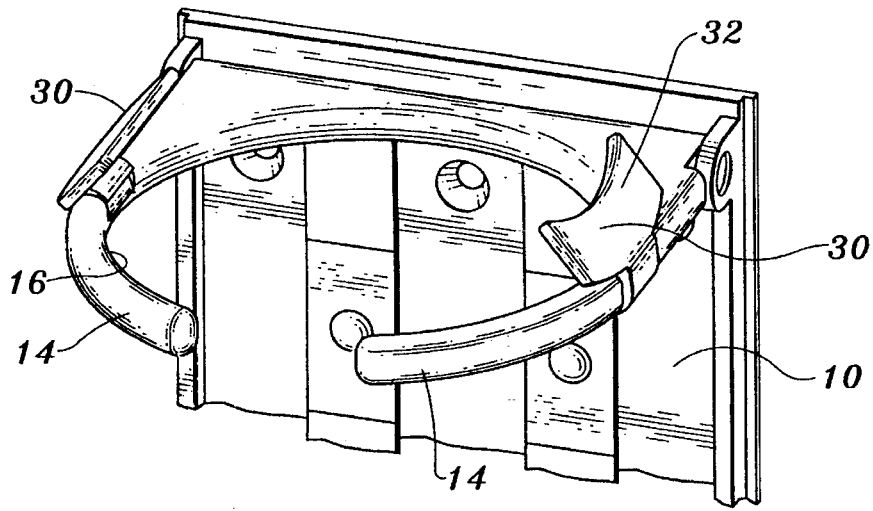
FIG. 2 is a partial perspective view of the apparatus illustrating the beverage container engagement members inclined and in a position wherein the opening is generally unconstricted.

The beverage container engagement members 30 are movable between the position shown in FIG. 3, for example, wherein the members 30 extend inwardly of the holder arms and the opening between the holder arms is constricted thereby and the inclined position shown in FIG. 2, for example, wherein the members 30 do not constrict the opening to as great an extent. That is, the members 30 when inclined, leave the opening generally unconstricted. In the condition shown in FIG. 2, a beverage container larger than can 18 can be readily accommodated by the apparatus and held in position by the members 30.

Figure 7:
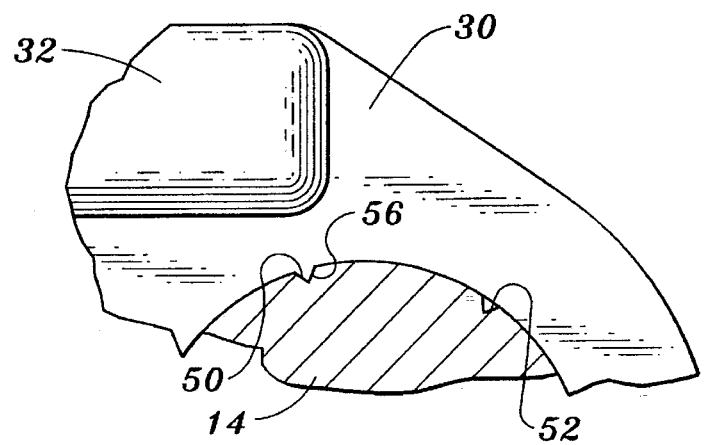
FIG. 7 is a greatly enlarged, detail, sectional view taken along the line 7—7 in FIG. 5.

In the arrangement illustrated, each of the holder arms 14 defines a recess 40 (see, for example, FIG. 3). A stop or abutment 42 at the location of each recess 40 is engaged by the attachment arm 36 of its associated member 30 when the member is in the inclined or generally unconstricting condition shown in FIGS. 2 and 6, for example. This ensures that the container engaged by the curved or arcuate distal end 48 of each plate 32 will be firmly held. In addition, indents 50, 52 (see FIG. 7) are formed in the arms 14. These indents selectively receive a detent 56 projecting from member 30. Indent 52 receives detent 56 when the member is in its inclined condition and indent 50 receives the detent 56 when the beverage container engagement plate 32 is in its constricting or horizontal condition. This latter condition is shown in FIG. 4, 5 and 7, for example. Additional stability is provided for the member 30 when the plate 32 thereof is in its horizontal position due to the fact that some of the plate 32 overlaps a portion of its associated holder arm, thus positively preventing further downward movement of the beverage container engagement member.

I claim:

1. Apparatus for supporting a beverage container, said apparatus comprising, in combination:

a back member;

a base member attached to said back member for supporting said back member in an upright condition;

beverage container holder means including a pair of holder arms projecting outwardly from said back member over said base member and defining an opening for receiving a beverage container; and beverage container engagement means connected to said holder arms and movable relative thereto for selectively constricting the size of the opening defined by said holder arms, said beverage container engagement means comprising a beverage container engagement member pivotally attached to each of said holder arms and pivotally movable between a first position wherein said opening is constricted thereby and a second position wherein said opening is generally unconstricted thereby, said beverage container engagement members being in opposition to one anther and separately and independently pivotally movable upon application of manual force thereto.

2. The apparatus according to claim 1 wherein each of said beverage container engagement members includes an arcuate distal surface for engaging a beverage container supported by said apparatus.

3. The apparatus according to claim 2 wherein each of said beverage container engagement members includes a beverage container engagement plate partially defined by said arcuate distal surface, said beverage container engagement plate being substantially horizontal when said beverage container engagement member is in said first position and inclined when said beverage container engagement member is in said second position.

4. The apparatus according to claim 3 wherein said beverage container engagement plates engage their respective holder arms when said beverage container engagement members are in said first position.

5. The apparatus according to claim 1 wherein each of said beverage container engagement members includes an attachment element at least partially surrounding and frictionally engaging a holder arm to provide a pivotal interconnection between the beverage container engagement member and associated holder arm.

6. The apparatus according to claim 5 wherein said attachment element includes two attachment arms defining a recess of substantially circular-shaped cross-section receiving a holder arm and a gap between said attachment arms communicating with said recess, at least one of said attachment arms being flexible to allow said holder arm engagement members to be selectively snapped into or out of engagement with said holder arms.

7. The apparatus according to claim 5 wherein said holder arm engagement member is of molded plastic construction.

8. The apparatus according to claim 1 additionally comprising retainer means for selectively retaining said beverage container engagement members in either said first position or said second position.

9. The apparatus according to claim 8 wherein said retainer means includes a stop integrally formed on at least one of said holder arms for abutment by said beverage container engagement member.

10. The apparatus according to claim 8 wherein said retainer means includes selectively engageable indents and detents on said at least one holder arm and the beverage container engagement member on said at least one holder arm.

11. Apparatus for supporting a beverage container, said apparatus comprising, in combination:

a back member;

a base member attached to said back member for supporting said back member in an upright condition;

beverage container holder means including a pair of holder arms projecting outwardly from said back member over said base member and defining an opening for receiving a beverage container;

beverage container engagement means connected to at least one of said holder arms and movable relative thereto for selectively constricting the size of the opening defined by said holder arms, said beverage container engagement means comprising a beverage container engagement member pivotally attached to at least one of said holder arms and pivotally movable between a first position wherein said opening is constricted by said beverage container engagement member and a second position wherein said opening is generally unconstricted by said beverage container engagement member; and retainer means for selectively retaining said beverage container engagement member in either said first position or said second position, said retainer means including selectively engageable indents and detents on said at least one holder arm and the beverage container engagement member on said at least one holder arm.

\* \* \* \* \*